United States Patent
Edwards et al.

(10) Patent No.: US 7,102,321 B2
(45) Date of Patent: Sep. 5, 2006

(54) CONTROL METHOD FOR PEAK POWER DELIVERY WITH LIMITED DC-BUS VOLTAGE

(75) Inventors: John Edwards, Kent, WA (US); Longya Xu, Dublin, OH (US); Brij B. Bhargava, Santa Barbara, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/335,804

(22) Filed: Dec. 31, 2002

(65) Prior Publication Data

US 2004/0124805 A1 Jul. 1, 2004

(51) Int. Cl.
*H02P 7/42* (2006.01)
*H02M 7/162* (2006.01)

(52) U.S. Cl. .................. 318/801; 318/800; 318/254; 363/95; 363/98

(58) Field of Classification Search .......... 318/432, 318/700, 809, 811, 799, 800, 801, 802, 722, 318/727, 254, 439, 138, 139; 363/95, 98, 363/41, 43, 17, 97, 39, 40, 131–139
See application file for complete search history.

(56) References Cited

U.S. PATENT DOCUMENTS 5,355,297 A * 10/1994 Kawabata et al. ............ 363/43
5,910,892 A *  6/1999 Lyons et al. ................. 363/98
6,031,738 A *  2/2000 Lipo et al. ................... 363/37

(Continued)

FOREIGN PATENT DOCUMENTS

JP          2001231263 A  *  8/2001
JP          2001268936 A  *  9/2001

OTHER PUBLICATIONS

Title: "Neutral–Point–Clamped Inverter with Improved Voltage Waveform and Control Range"□□1993–IEEE–IAS Conference Proceedings 0–7803–0891–03/93□□Autors: Roberto Rojas, Tokuo Ohnishi, and Takayuki Suzuki□□pp. 1240–1245.*

Title: "A Vector Control System Using a Neutral–Point–Clamped Voltage Source PWM Inverter"□□1991–IEEE–IAS Conference Proceedings 0–7803–0453–5/91□□Autors: Satoshi Ogasawara and Hirofumi Akagi□□pp. 422–427.*

Title: "Space Vector PWM Strategy For 3–Level Inverters With Direct Self–Control"□□1993 The European Power Electronics Association□□Autors: A.M. Walczyna and R.J. Hill□□pp. 152–157□□.*

(Continued)

*Primary Examiner*—David Martin
*Assistant Examiner*—Eduardo Colon Santana
(74) *Attorney, Agent, or Firm*—Lee & Hayes, PLLC

(57) ABSTRACT

A method for driving a neutral point-clamped multi-level voltage source inverter supplying a synchronous motor is provided. A DC current is received at a neutral point-clamped multi-level voltage source inverter. The inverter has first, second, and third output nodes. The inverter also has a plurality of switches. A desired speed of a synchronous motor connected to the inverter by the first second and third nodes is received by the inverter. The synchronous motor has a rotor and the speed of the motor is defined by the rotational rate of the rotor. A position of the rotor is sensed, current flowing to the motor out of at least two of the first, second, and third output nodes is sensed, and predetermined switches are automatically activated by the inverter responsive to the sensed rotor position, the sensed current, and the desired speed.

22 Claims, 6 Drawing Sheets

U.S. PATENT DOCUMENTS

| | | | |
|---|---|---|---|
| 6,058,031 A * | 5/2000 | Lyons et al. | 363/67 |
| 6,262,904 B1 * | 7/2001 | Meynard et al. | 363/95 |
| 6,362,586 B1 * | 3/2002 | Naidu | 318/432 |
| 6,534,949 B1 * | 3/2003 | Szczesny et al. | 318/801 |
| 6,590,361 B1 * | 7/2003 | Walters et al. | 318/727 |
| 6,639,371 B1 * | 10/2003 | Walters et al. | 318/254 |

OTHER PUBLICATIONS

"Space vector pulse width modulation of three–level inveter extending operation to overmodulation region".☐☐Mondal, S.K.; Bose, B.K.; Oleschuk, V.; Pinto, J.O.P.;Power Electronics Specialists Conference, 2002.IEEE 33rd Annual , vol.: 2, pp.:497–502☐☐.*

T. Jahns, Interior Permanent–Magnet Synchronous Motors for Adjustable–Speed Drives, IEEE Tans. Industrial Applications, vol. IA–22, No. 4, pp. 738–747, Jul./Aug., 1986.

J.W. Choi, S.K. Sul, New Current Concept–Minimum Time Current Control in the Three–Phase PWM Converter, IEEE Transactionis on Power Electronics, vol. 12, No. 1, pp. 124–131, 1997.

L. Xu, S. Li, A Fast Response Torqu Control for Interior Permanent–Magnet Synchronous Motors in Extended Flux–Weakening Operation Regime, International Elctric Machine and Frive Conference, Cambridge, Massachusetts, Jun. 17–21, 2001.

L. Xu, S. Li, Torque Control Patching and Anti–Windup and Bump–less Transfer Conditioning of Current Regulators for High–Speed PSMSM Systems, 32nd IEEE Power Electronics Specialist Conference, Vancouver, Jun. 17–22, 2001.

Alain Chabod et al., Flywheel Energy Storage for Quality Power in the Semiconductor Production Industry, 8 pgs., AP–MKT–WPST–001 (05042002).

Bradley S. Walter, High Reliability Battery–Free Power Quality Solutions for Large Internet Data Centers, AP–MKT–WPDC–001 (05042002).

* cited by examiner

CONTROL METHOD FOR PEAK POWER DELIVERY WITH LIMITED DC-BUS VOLTAGE

GOVERNMENT RIGHTS

This invention was made with Government support under contract number DE-PS36-97G00231 awarded by the Department of Energy. The government has certain rights in this invention.

FIELD OF THE INVENTION

This invention relates generally to power conversion and, more specifically, to multi-level inverter modulation.

BACKGROUND OF THE INVENTION

Voltage source inverters are utilized in AC motor drive, utility interface, and an uninterruptible power supply ("UPS") applications as a means for converting DC to AC electrical power. A traditional voltage source inverter generates a low frequency output voltage with controllable magnitude and frequency by programming high-frequency voltage pulses. The high frequency voltage pulses open and close switches to expose a load to pulses of DC current. An inverter of this type is said to be using pulse width modulation ("PWM"). Timing, duration, and voltage of the pulses simulate the peaks and troughs of traditional sinusoidal alternating current. Where the load has an inherent inductive nature, such as windings of a motor, the pulses approximate the sinusoid without significant high frequency harmonics.

To handle larger and larger input voltages, larger switching transformers are needed. Where silicon fabrication has not kept up with the need for greater power, a multi-level inverter topology has arisen. The topology equally divides two input voltage sources, thereby allowing twice the total voltage at the output for the same capacity transistor. The inverter was further refined for applications that do not have divided input voltage sources to have instead a series connected capacitor bank defining a neutral point-clamped multi-level voltage source inverter.

The three-level voltage source inverter is one of the most popular topologies for three-phase three-level voltage source inversion. The advantages of the three-level voltage source inverter are:

1) Because of the redundancy of the switches, voltage across any one switch is only half of the DC bus voltage;
2) Switching losses are cut in half due to the reduced harmonics present in the output wave forms for the same switching frequency; and
3) The power rating increases.

The literature recognizes certain drawbacks, as well, in the three-level voltage source inverter. Such inverters require complex control circuitry, each of the redundant switches add to the price of the voltage source inverter, and the charge at the mid point between the two DC linking capacitors can accumulate when switching is not balanced.

Due to improvements of fast-switching power semiconductor devices and machine control algorithms, high performance PWM dc-ac inverters find a growing interest. Among requirements of PWM inverters, full utilization of the dc bus voltage is extremely important to achieve maximum output torque under all operating conditions for synchronous motor drive applications. With a voltage source inverter, the output voltage is bounded by dc link voltage in the form of hexagon. When a reference voltage vector exceeds the hexagon boundary, the reference voltage cannot be applied to the motor. This state of exceeding the hexagon boundary is referred to as 'overmodulation'. When an inverter operates in continuous overmodulation mode at high speed, inverter output voltage contains substantial sub-carrier frequency harmonics. As a result, drive performance degrades considerably.

Though fundamental component voltage gain and current waveform characteristics in the overmodulation region are well improved, these schemes are suitable only for an open loop (volts-per-hertz) controlled synchronous motor drive, not a vector-controlled synchronous motor drive.

Vector controlled permanent magnet synchronous motor drive requires closed loop current control with fast dynamic characteristics. Although the performance of current PWM inverters meets the requirement within the voltage boundary, in the overmodulation region the drive performance significantly degrades and the bandwidth of the regulator is shrunk. Therefore, the designed performance of current PWM inverters is guaranteed only in the linear modulation region. When inverter enters continued overmodulation region, the rotor flux should be weakened to reduce induced back-electromotive force voltage. It is, however, difficult to weaken rotor flux sufficiently in the transient state such as reference change, load disturbance, and sudden drop of utility voltage. This is because this transient state is much shorter than the rotor time constant in general. Therefore, in this case, a proper dynamic overmodulation scheme should be implemented because the modulation scheme determines the dynamic performance of the motor drive.

There is then an unmet need in the art for a proper dynamic overmodulation scheme for a three-level inverter.

SUMMARY OF THE INVENTION

A method for driving a neutral point-clamped multi-level voltage source inverter supplying a synchronous motor is provided. A DC current is received at a neutral point-clamped multi-level voltage source inverter. The inverter has first, second, and third output nodes. The inverter also has a plurality of switches. A desired speed of a synchronous motor connected to the inverter by the first second and third nodes is received by the inverter. The synchronous motor has a rotor and the speed of the motor is defined by the rotational rate of the rotor. A position of the rotor is sensed, current flowing to the motor out of at least two of the first, second, and third output nodes is sensed, and predetermined switches are automatically activated by the inverter responsive to the sensed rotor position, the sensed current, and the desired speed.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a method for driving a neutral point-clamped three-level voltage source inverter supplying a synchronous motor is provided. A DC current is received at a neutral point-clamped three-level voltage source inverter. The inverter has first, second, and third output nodes. The inverter also has a plurality of switches. A desired speed of a synchronous motor connected to the inverter by the first second and third nodes is received by the inverter. The synchronous motor has a rotor and the speed of the motor is defined by the rotational rate of the rotor. A position of the rotor is sensed, current flowing to the motor out of at least two of the first, second, and third output nodes is sensed, and predetermined switches are automatically activated by the inverter responsive to the sensed rotor position, the sensed current, and the desired speed.

Figure 1:
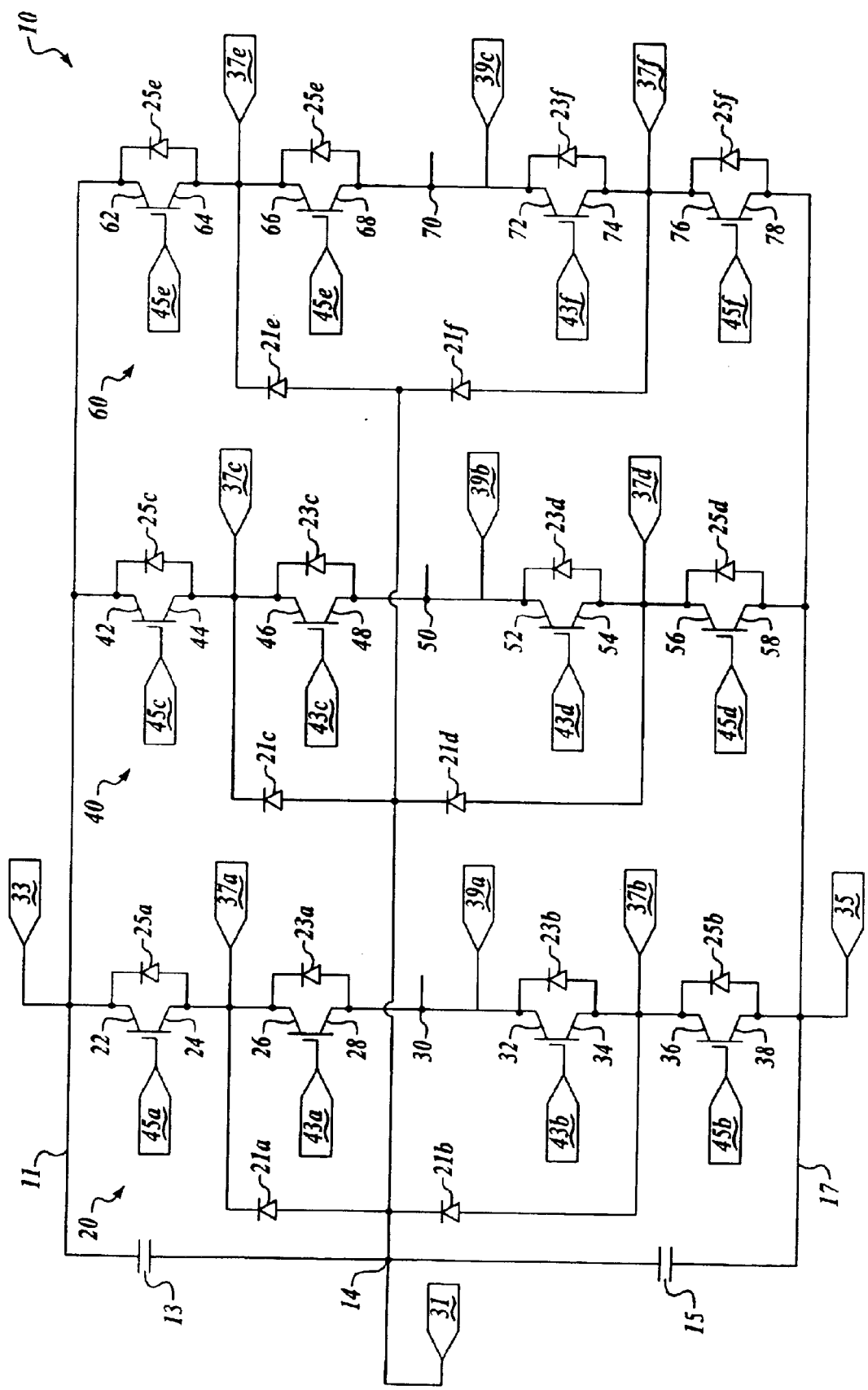
FIG. 1 is a schematic diagram of a three-level voltage source inverter.

Referring to FIG. 1 DC linking capacitors 13 and 15 are connected in series and separate a positive DC bus node 11 from a negative DC bus node 17. The capacitors 13 and 15 define a neutral point 14 between the capacitors 13 and 15 that is capable of accepting and storing either positive or negative charge. The neutral point 14 allows the voltage source inverter to treat the DC bus nodes 11 and 17 as though there were two equal DC sources connected in series defining three power rails: a positive rail 13, a neutral rail 14, and a negative rail 15. Three voltage sensors 31, 33, and 35 monitor health status of switches and diodes in the inverter 10, and convey the monitored status to a driver. The sensor 33 senses voltage on the positive node 11 side of the DC linking capacitor 13. Sensor 31 reports the charge stored at the neutral point 14 node between the DC linking capacitors 13 and 15. Finally, the sensor 35 senses the potential stored on the negative node 17 side of the DC linking capacitor 15.

A phase circuit 20 for Phase (Φ) A, a phase circuit 40 for ΦB, and a phase circuit 60 for ΦC are connected in parallel with each other. Each of the phase circuits 20, 40, and 60 are electrically connected to the positive node 11, the neutral point 14, and the negative node 17. For each phase, ΦA, ΦB, and ΦC in turn, first output terminals 37a, 37c, and 37e are paired with second output terminals 37b, 37d, and 37f to feed current to the synchronous motor.

The phase circuit 20 includes a switch 45a with a drain terminal 22 and a source terminal 24. The drain terminal 22 is connected to the positive node 11. A clamping diode 25a is connected across the drain terminal 22 and the source terminal 24. The source terminal 24 is connected to a drain terminal 26 and the source terminal 28. A clamping diode 21a is connected between the neutral point 14 and the drain terminal 26. The source terminal 28 is connect at an output node 30 to a drain terminal 32 of a switch 43b that also has a source terminal 34. A sensor 39a is also connected to the output node 30. A clamping diode 23b is connected across the source terminal 34 and the output node 30. A clamping diode 21b is connected between the neutral point 14 and the source terminal 34. The source terminal 34 is connected to the drain terminal 36 of a switch 45b that also has a source terminal 38 that is connect to the negative node 17. A clamping diode 25b and across the drain terminal 36 and the source terminal 38. The clamping diodes 21a, 23a, and 25a maintain voltage across the switches 43a and 45a within a voltage of the capacitor 13. The clamping diode's 21b, 23b, and 25b maintain fold state across the switches 43b and 45b within a voltage of the capacitor 15.

The phase circuit 40 includes a switch 45c with a drain terminal and a source terminal 44. The drain terminal 42 is connected to the positive node 11. A clamping diode 25c is connected across the drain terminal 42 and the source terminal 44. The source terminal 44 is connected to a drain terminal 46 and the source terminal 48. A clamping diode 21c is connected between the neutral point 14 and the drain terminal 46. The source terminal 48 is connected at an output node 50 to a drain terminal 52 of a switch 43d that also has a source terminal 54. A sensor 39b is also connected to the output node 50. A clamping diode 23d is connected across the source terminal 54 and the output node 50. A clamping diode 21d is connected between the neutral point 14 and the source terminal 54. The source terminal 54 is connected to the drain terminal 56 of a switch 45d that also has a source terminal 58 that is connected to the negative node 17. A clamping diode 25d and across the drain terminal 56 and the source terminal 58. The clamping diodes 21c, 23c, and 25c maintain voltage across the switches 43c and 45c within a voltage of the capacitor 13. The clamping diode's 21d, 23d, and 25d maintain fold state across the switches 43d and 45d within a voltage of the capacitor 15.

The phase circuit 60 includes a switch 45e with a drain terminal 62 and a source terminal 64. The drain terminal 62 is connected to the positive node 11. A clamping diode 25e is connected across the drain terminal 62 and the source terminal 64. The source terminal 64 is connected to a drain terminal 66 and the source terminal 68. A clamping diode 21e is connected between the neutral point 14 and the drain terminal 66. The source terminal 68 is connected at an output node 70 to a drain terminal 72 of a switch 43f that also has a source terminal 74. A sensor 39c is also connected to the output node 70. A clamping diode 23f is connected across the source terminal 74 and the output node 70. A clamping diode 21f is connected between the neutral point 14 and the source terminal 74. The source terminal 74 is connected to the drain terminal 76 of a switch 45f that also has a source terminal 78 that is connected to the negative node 17. A clamping diode 25f and across the drain terminal 76 and the source terminal 78. The clamping diodes 21e, 23e, and 25e maintain voltage across the switches 43e and 45e within a voltage of the capacitor 13. The clamping diode's 21f, 23f, and 25f maintain fold state across the switches 43f and 45f within a voltage of the capacitor 15.

Figure 2:
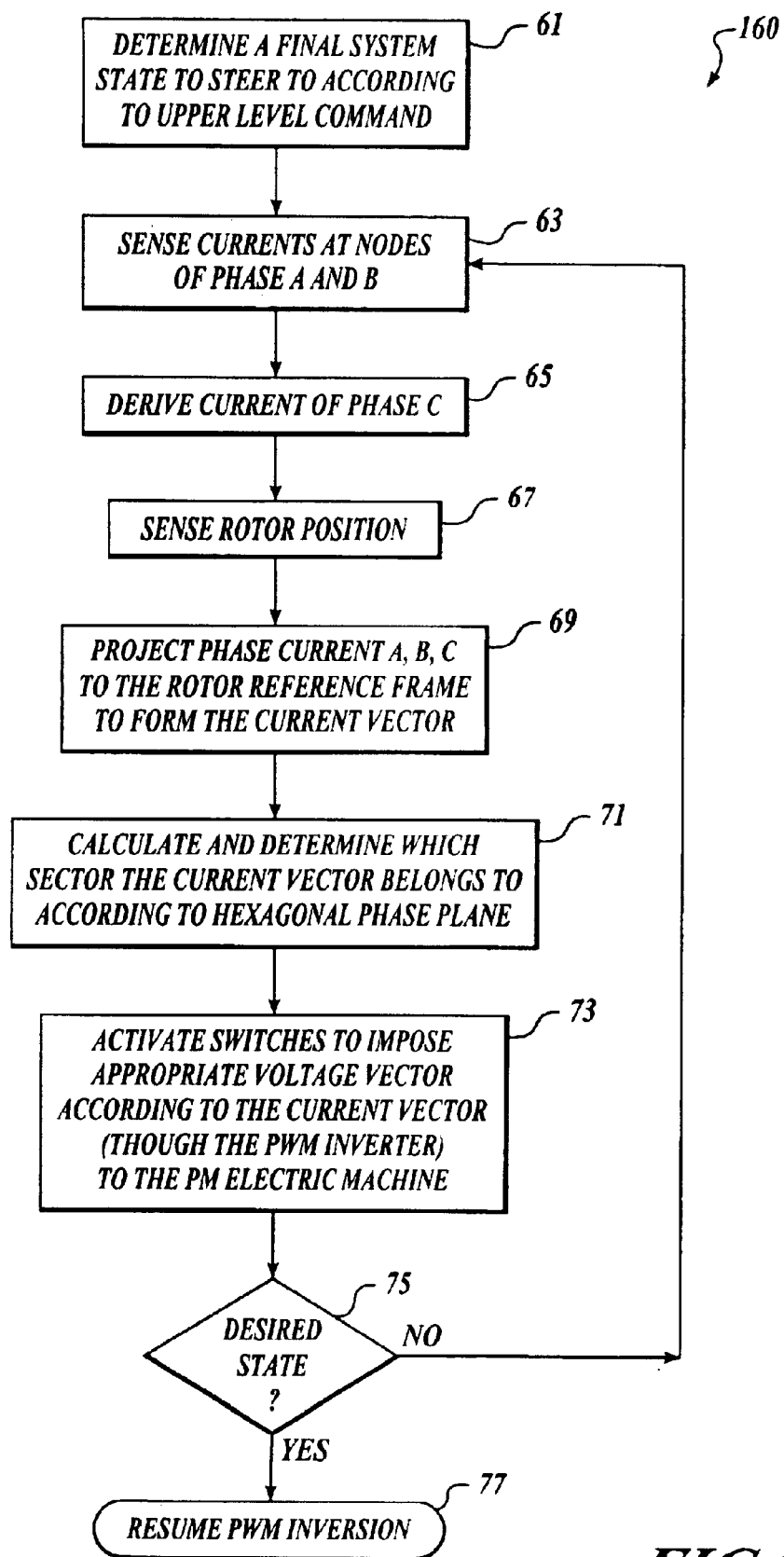
FIG. 2 is a flow chart of a method of driving the inverter.

Referring to FIG. 2, a method 160 for driving the inverter in the overmodulation region. At a block 61, a command is received for a change of state for a motor driven by a three-level voltage source inverter. Such commands might include a machine language equivalent of "make your speed 24,000 r.p.m., make your current state $I_d=0$, $I_q=0$." Whatever the desired state, the inverter is informed by any acceptable means. Those skilled in the art will appreciate that any sort of communication of the command will suffice. Analog or digital indicators of desired state are suitable. The method 160 does not require a precise desired speed. For this purpose, acceleration versus deceleration of the rotational speed, increased or decreased current on either axis, is a sufficient command.

At a block 63, the current sensors 39a, 39b, and 39c (FIG. 1) read current flowing into or out of each of the nodes 30, 50, and 70 (FIG. 1) connecting the inverter to the motor (not shown). Those skilled in the art will readily appreciate that the current may be sensed by any means suitable to indicate current flowing through the nodes 30, 50, and 70 (FIG. 1). One such method might be to place resistors of small but precisely known resistance in series between the inverter and the motor at each node. Knowing the voltage on each side of the resistor allows derivation of the current by Ohm's Law. Additionally, at a block 65, where the current flowing into two of the nodes of a motor are known, Kirchoff's First Law, treating the motor as a node, will derive the current flowing into the third node of the motor.

At a block 67, position of the rotor within the motor is sensed. The position of the rotor is suitably sensed with an acceptable precision generally within a tenth of a degree without limitation, depending upon the steepness of the anticipated current curve at the rotor position. Those skilled in the art are familiar with several means of sensing the position of the rotor.

At a block 69, the inverter 10 (FIG. 1) derives a current vector descriptive of the phase and magnitude of current flowing into the motor. The derived current vector rests in one of six sectors, as defined below in FIG. 4a. At a block 71, the inverter 10 determines in which of the sectors, the current vector rests.

Once the sector is determined, the switches, which must be activated to extract a maximum amount of energy remaining in the inverter, are also determined. At a block 71, the sector defines the switching pattern necessary to effect this extraction. In one preferred embodiment, the inverter uses a "look-up" table to quickly select the switches to best drive the motor to the desired state. Those skilled in the art will readily appreciate that the same effect can be achieved with Boolean switching networks, PPL chips, and the like. At a block 73, the inverter 10 activates the necessary switches as derived at the block 71.

When the switches have been appropriately activated, the inverter 10 continues to sense the current and the rotor position according to the blocks 63 and 67, respectively. If the motor has reached the desired state according to the sensed current and rotor position and speed, the inverter 10 returns to normal pulse width modulated operation. If not, the method returns to the block 63.

Figure 3:
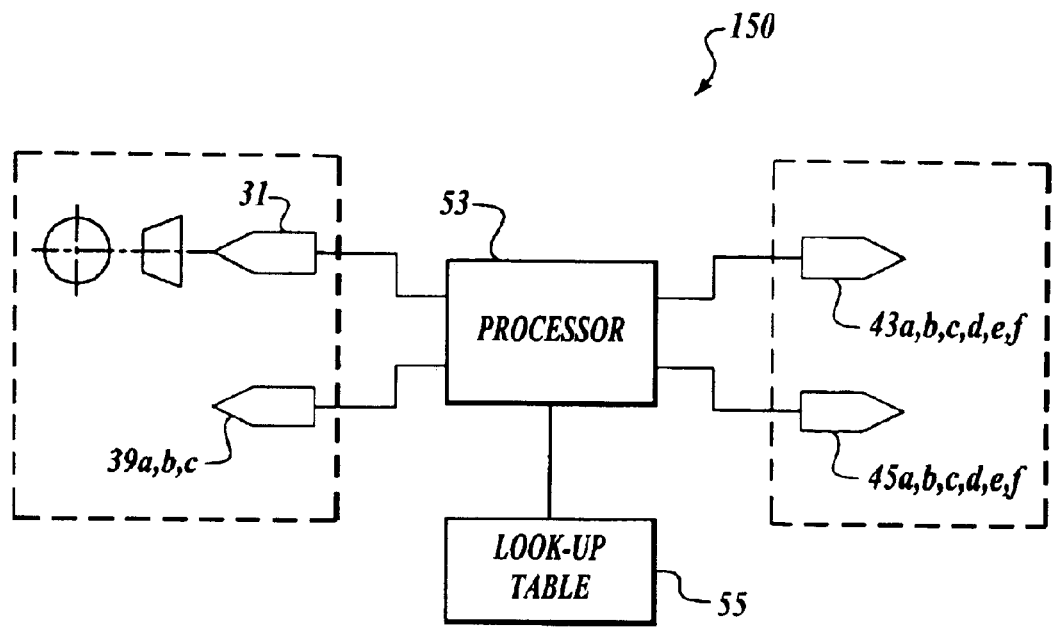
FIG. 3 is a block diagram of sensing and control components.

Referring to FIGS. 1 and 3, FIG. 3 is a block diagram of a logic engine 105 to drive the several components of the inverter 10. There are current sensors at 39a, b, and c; these sense the current through the output nodes 30, 50, 70 for each of the three phases A, B and C respectively. Alternate embodiments may use sensors situated to sense current into or out of a node such that Kirchoff's first law is suitably used to determine the current state of the motor.

A sensor 31 measures the angle of the rotor in order to compare the anticipated current state to the instantaneous current state. Additionally, by receiving the rotational position of the rotor from moment to moment a processor 53 advantageously tracks the speed of the rotor. In steady-state operation, the processor 53 independently triggers each of the switches 43a, b, c, d, e, and f, and the switches 45a, b, c, d, e, and f, in turn, to produce the progression of the phase (and therefore the rotor position) through the whole of each cycle. When the desired state changes, the processor 53 activates the switches 43a, b, c, d, e, and f, and the switches 45a, b, c, d, e, and f, according to the sensed current at the nodes 39a, b, and c and the sensed rotor position. To aid the processor 53 in the selection of the appropriate switches, the processor 53 refers to a memory configured as a look-up table 55, looking up switching sequences according to the method 160 (FIG. 2).

Figure 4A:
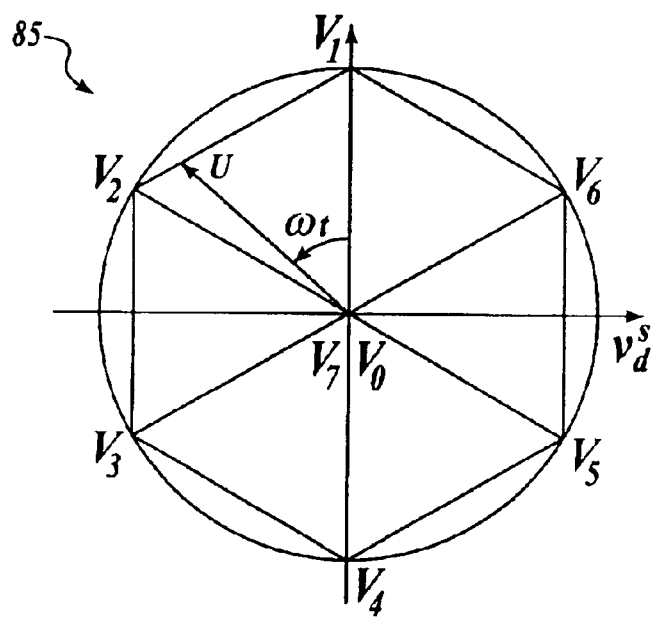
FIG. 4a shows a hexagonal geography resulting from phase angle mathematics.
Figure 4B:
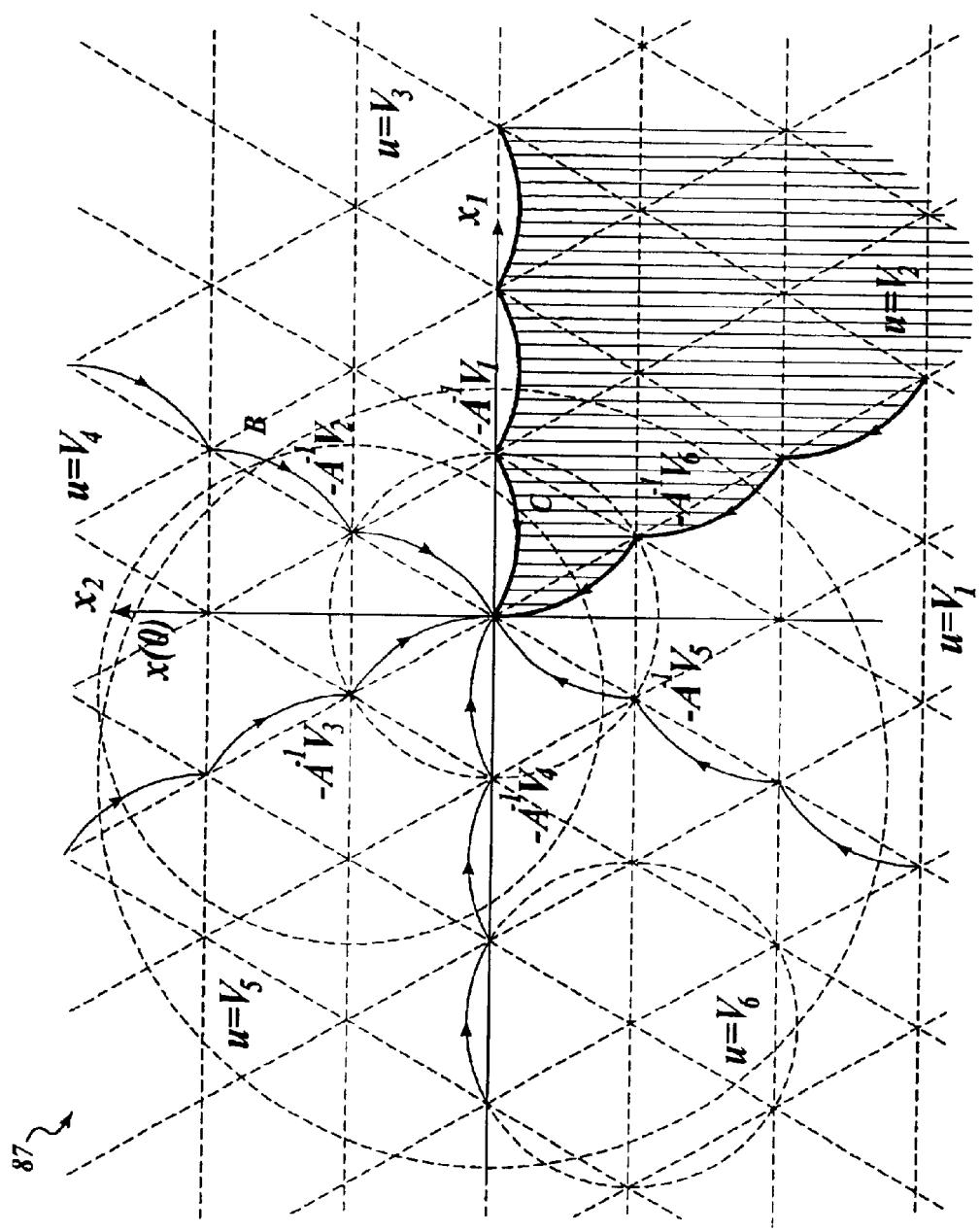
FIG. 4b is a hexagonal overlay of a state diagram of the rotor depicting the sector.

Referring to FIG. 4a, the cycle for switching the inverter 10 is based on the time-optimal control theory. The theory is expressed in a switching diagram for the closed loop time-optimal current transition. In FIG. 4b, the phase plane is divided into 6 sectors $\{\{u=V_i\}; _i=1, \ldots, 6\}$ with each corresponding to one inverter voltage vector. The hatched area in FIG. 4 shows the sector corresponding to the voltage vector $V_2$. In a first order approximation, the phase plane can be simply divided into the corresponding 6 angular sectors. The following equations represent the PMSM dynamics:

Defining the magnetizing current as $$\tilde{i}_d = i_d + \frac{\lambda_f}{L_d}$$

and dynamics system state as $x=[L_d\tilde{i}_d, L_q i_q]^T$ and control variable as $u=[v_d, v_q]^T$, the PMSM dynamic equations, with winding resistance R neglected, are $$\dot{x} = Ax + u, \text{ with } A = \begin{bmatrix} 0 & \varpi_e \\ -\varpi_e & 0 \end{bmatrix}.$$

Under the hexagonal voltage constraint, there exists an optimal transition from the initial flux linkage vector $x(0)=[L_d\tilde{i}_d(0), L_q i_q(0)]^T$ to the desired flux linkage vector $x(t_f)=[L_d\tilde{i}_d(t_f), L_q i_q(t_f)]^T$ This time-optimal control theory method 160 described in FIG. 2 is based upon only three data points: 1) which sector the system state the system comprising the inverter and the motor is in; 2) the rotor position; and 3) current into the motor. Then, an appropriate set of voltage vectors are applied to the motor by activating 43a, b, c, d, e, and f, and the switches 45a, b, c, d, e, and f in a proper sequence. While bringing the motor current vector from the initial state to the desired final state in a minimum amount of time, the feedback control law reduces the inverter switching to the minimum and, hence, reduces the switching power loss. After the transition process is finished, inverter operation of the inverter 10 is conveniently restored back to regular PWM mode.

Figure 4C:
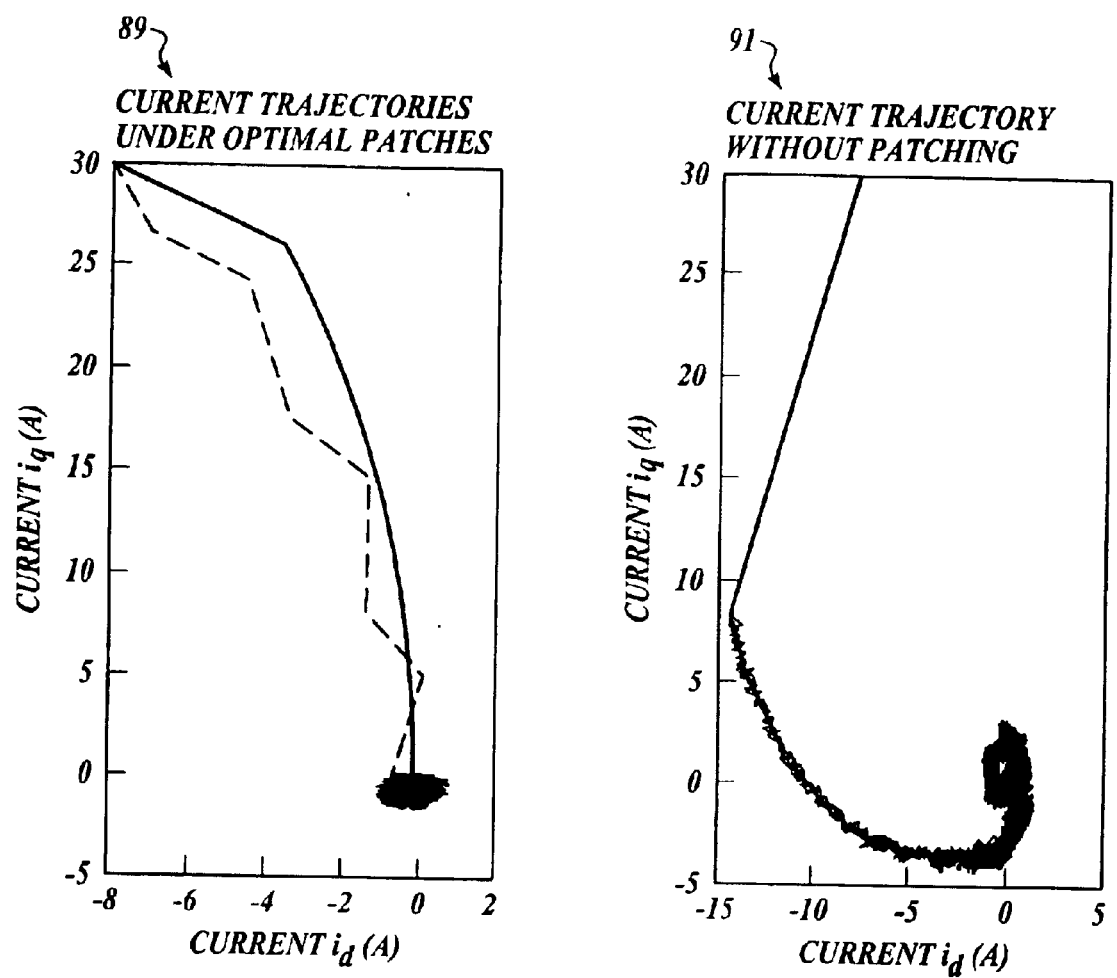
FIG. 4c is a comparison of current trajectory with and without the driving method for the three-level voltage inverter.

Considering the described response to a requested change of state as a patched response, FIG. 4c compares current trajectories 89 and 91, in the synchronous reference frame, of a patched driver according to the invention and a saturated or un-patched current regulator, respectively. The current collapse (indicated by the negative slope of the trajectory) in the un-patched driver shows graphically that the current trajectory the causes the sluggish response of the motor when states are changed without the patch. The graphs are time-independent and do not show the individual components of the trajectory over time.

Figure 5:
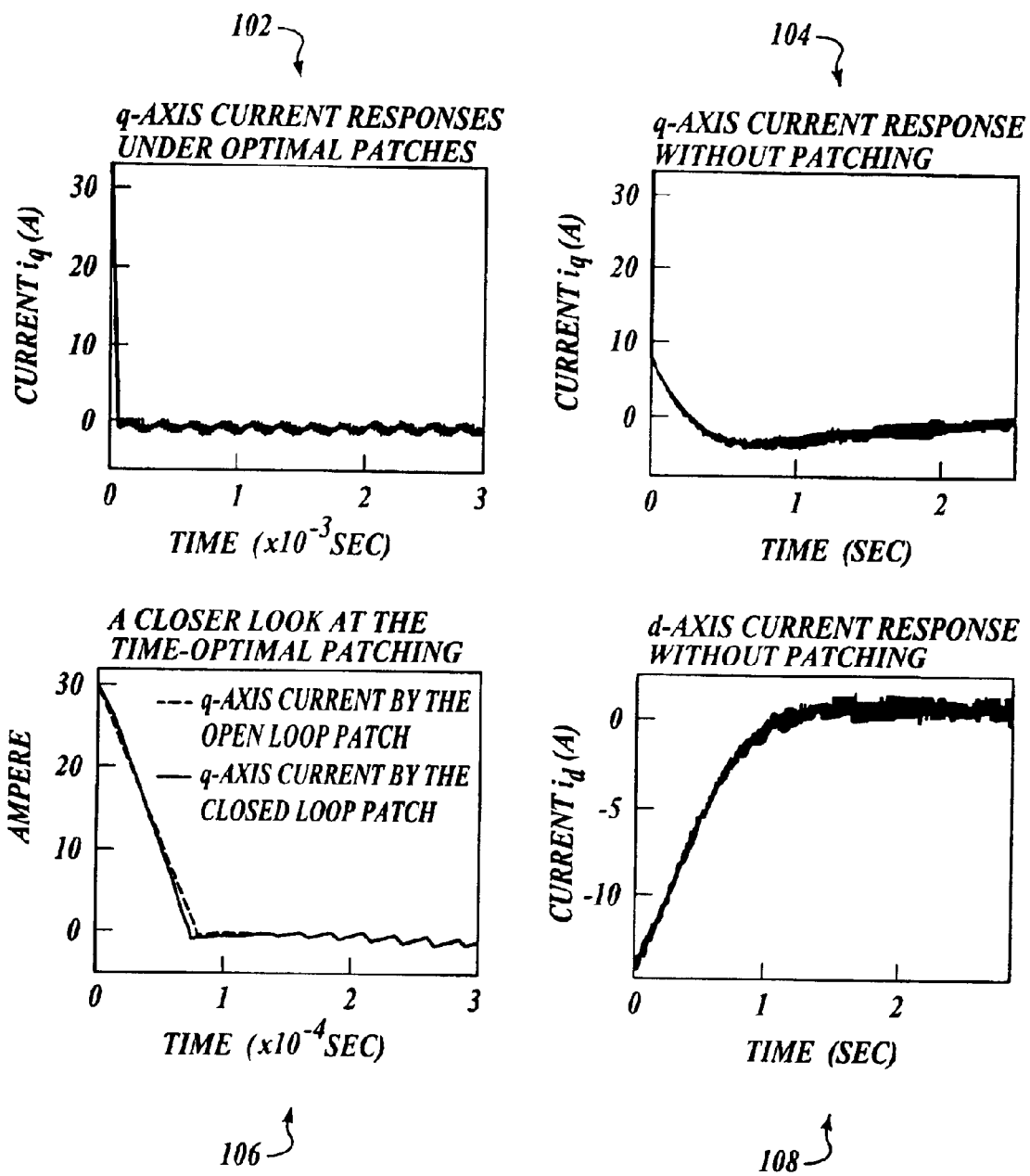
FIG. 5 is a comparison of current response with and without the driving method for the three-level voltage inverter.

FIG. 5 splits the q-axis and d-axis currents into graphs in a time reference of a motor current during a change of state, rather than plotting the q-axis against the d-axis as in FIG. 4c. A view of a plot 102 and, again, on a time-stretched scale, the q-axis current in the plot 106, clearly shows usable power lingering to run the motor as a result of the patch. The reasons for this are evident in the remaining plots. At a plot 104, the graph clearly demonstrates an overshoot in the current on the q-axis in the un-patched driver during the change of states. This overshoot traces the actual reversal of current in the windings working against the change of state. At the same time, the negative d-axis current slowly approaches the y-axis in the un-patched in a plot 108. It was this slow slope that convinced the inventors that power remained in the system for the purpose of driving the motor. In the patched driver, that power is brought to bear to turn the motor and is as shown in the plot 106.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for driving a neutral point-clamped multi-level voltage source inverter supplying a synchronous motor, the method comprising:
   receiving DC current at a neutral point-clamped multi-level voltage source inverter, the inverter having first, second, and third output nodes, the inverter having a plurality of switches;
   receiving a desired speed of a synchronous motor connected to the inverter by the first second and third nodes, the synchronous motor having a rotor, the speed of the motor being defined by rotational rate of the rotor;
   sensing a position of the rotor;
   sensing current flowing to the motor out of at least two of the first, second, and third output nodes; and
   automatically activating predetermined switches responsive the sensed rotor position, the sensed current, and the desired speed.

2. The method of claim 1, wherein sensing current flowing to the motor includes deriving current flowing through the third node, based upon sensed current flowing through at least two of the first, second, and third output nodes.

3. The method of claim 1, wherein receiving a desired speed of a synchronous motor includes sensing a desired current flow for each of the first, second, and third output nodes.

4. The method of claim 3, wherein sensing a position of the rotor includes projecting phase current at the first, second, and third output nodes to a rotor reference frame to derive a current vector.

5. The method of claim 4, wherein projecting phase current includes determining a sector if the rotor reference frame that contains the current vector.

6. The method of claim 5, wherein the predetermined switches are selected based upon the determined sector.

7. A driver for a neutral point-clamped multi-level voltage source inverter, the driver comprising:
   a processor configured to receive a command representative of a desired state of a synchronous electric motor;
   a plurality of current sensors configured to generate a signal indicative of current sensed at at least two output nodes connecting a neutral point-clamped multi-level voltage source inverter to the synchronous electric motor, the output nodes including first, second, and third output nodes, the inverter having a plurality of switches;
   a position sensor configured to generate a signal indicative of a rotational position of a rotor of the synchronous electric motor; and
   means for automatically activating predetermined switches responsive to the received command, the signal indicative of each of the sensed currents, and the signal indicative of the rotational position of the rotor.

8. The driver of claim 7, wherein the driver further comprises means for deriving current flowing through the third node based upon the sensed current flowing through at least two of the output nodes.

9. The driver of claim 7, wherein the desired state of the synchronous motor includes a desired rotational speed.

10. The driver of claim 7, wherein the desired state includes a current flow for each of the first, second, and third output nodes.

11. The driver of claim 7, wherein the driver further includes means for projecting phase current at each of the first, second, and third output nodes according to the rotational position of the rotor to derive a current vector in a rotor frame of reference.

12. The driver of claim 11, wherein the derived current vector determines a sector in the rotor reference frame that contains the current vector.

13. The driver of claim 12, wherein the predetermined switches are selected based upon the determined sector.

14. The driver of claim 7, wherein the predetermined switches are automatically activated based upon an entry in a look-up table corresponding to the desired state of the synchronous motor, the current sensed at each of the first, second, and third output nodes, and the rotational position of the rotor.

15. The driver of claim 14, wherein the automatically activating means include a processor.

16. A neutral-point-clamped multi-level voltage source inverter, the inverter powering a
   multi-phase electrical synchronous motor, the inverter comprising:
   a neutral point-clamped multi-level voltage source inverter, the inverter having first, second, and third output nodes, the inverter having a plurality of switches;
   a plurality of current sensors configured to generate a signal indicative of current sensed at at least two of the output nodes connecting the neutral point-clamped multi-level voltage source inverter to the synchronous electric motor;
   a position sensor configured to generate a signal indicative of a rotational position of a rotor of the synchronous electric motor; and
   a processor configured to automatically activate predetermined switches responsive to a received command representative of a desired state of a synchronous electric motor, the signal indicative of each of the sensed currents, and the signal indicative of the rotational position of the rotor.

17. The inverter of claim 16, wherein the processor is further configured to derive current flowing through the third node based upon the sensed current flowing through the at least two of the output nodes.

18. The inverter of claim 17, wherein the processor is further configured to project phase current at each of the first, second, and third output nodes according to the rotational position of the rotor.

19. The inverter of claim 17, wherein the processor is further configured to derive a current vector based upon the rotational position of the rotor to determine a sector in the rotor reference frame that contains the current vector.

20. The inverter of claim 19, wherein the processor is further configured to select the predetermined switches based upon the determined sector.

21. The inverter of claim 16, wherein the desired state includes desired current flow for each of the first, second, and third output nodes.

22. The inverter of claim 16, wherein the processor is further configured to determine the switches to activate based upon an entry in a look-up table corresponding to the reference frame that contains the current vector.

* * * * *